No. 48,656.
S. E. CHANEY.
CAR COUPLING.
PATENTED JULY 11, 1865.
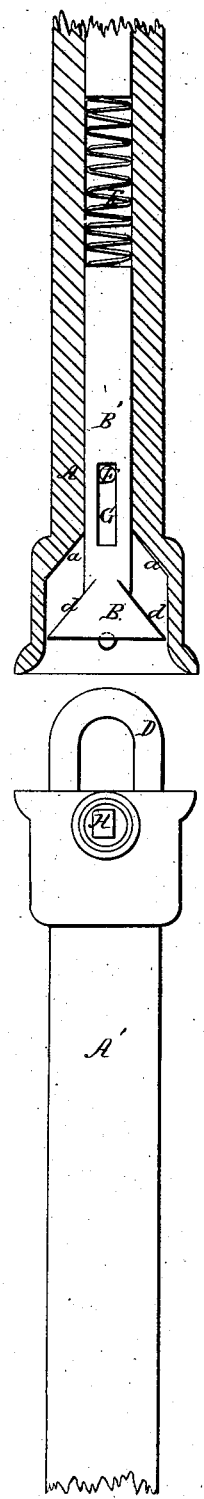
Witnesses
Charles D. Smith
Alex. A. E. Haucke
Inventor.
Samuel E. Chaney
By Munn & Co
Attorneys

UNITED STATES PATENT OFFICE.

SAML. E. CHANEY, OF HILLSBOROUGH, OHIO.

IMPROVED CAR-COUPLING.

Specification forming part of Letters Patent No. 48,656, dated July 11, 1865.

*To all whom it may concern:*

Be it known that I, SAMUEL E. CHANEY, of Hillsborough, in the county of Highland and State of Ohio, have made new and useful Improvements in Car-Couplings; and I do hereby declare the following to be a full, clear, and exact description of the nature, construction, and operation of the same, reference being had to the accompanying drawings, in which my improvement is represented by a plan view, the upper portion of one of the draw-heads being removed to show the interior, which contains the moving parts.

The object of my improvement is to provide an automatic means of attachment of the coupling-links which connect the respective draw-heads of two cars, so that by the collision the unconnected end of the link shall act upon the piston which sustains the coupling-pin, and, thrusting it back, shall allow the pin to drop into its lower position in which engages the coupling-link.

The point of novelty in my improvement consists in the devices for limiting the motions of the said piston.

To enable one skilled in the branch of mechanical construction and operation to which my invention appertains, I will proceed to describe it.

A A' are the draw-heads on the adjacent ends of the cars, and at the rear of each is a chamber traversed by the stem B' of the piston B, the head of which occupies the opening C in the draw-head and reciprocates therein under the counter impulses of the spring and contact with the link D of the other draw-head. The spring E operates upon the rear of the piston-stem B', and the motion of the piston in this, the outward direction, is limited by the pin F, which occupies a slot, G, in the piston-stem.

The other details will be as clearly understood from a description of the operation, which is as follows: The link D, being thrust against the head of the piston B in one of the draw-heads, drives the said piston inwardly, so that the coupling-pin H, whose end was supported by the said piston, now drops, falling within the link and engaging it. The pressure being now removed, the spring E acts upon the piston, and through it upon the link, so as to retain the latter in a horizontal position ready for engagement in the draw-head of the adjacent car on being brought in contact therewith. On this taking place the piston-head is so far receded in the direction of the motion of the approaching car that the oblique rear faces, $d\ d$, of the piston-head come in contact with the corresponding portions $a\ a$ of the draw-head and limit the play of the piston in that direction, while, on the release of the thrust, the piston is brought in contact with the end of the link. When the cars are uncoupled by the withdrawal of a coupling-pin, H, the piston B is so far projected as to intervene between the holes on the upper and under sides of the draw-head, so that the end of the coupling-pin rests upon it and is ready for recoupling by the contact of the link which recedes the piston.

Under the conditions above described, when the end of the pin is resting upon the piston and the latter is thrust out, its progress in that direction is limited by the pin F in the slot G.

Having thus described my invention, what I claim therein as new, and desire to secure by Letters Patent, is—

The method of controlling the motions of the piston in the draw-head by the shoulder in the rear of the head B, and the pin F, which traverses the slot G, the whole arranged substantially as described and represented.

The above specification of my improvement in railroad-car couplings I have signed this 26th day of April, 1865.

SAMUEL E. CHANEY.

Witnesses:
FRANK G. DEBRUIN,
WM. M. MEEK.